United States Patent
Pleasant

(10) Patent No.: US 6,591,086 B1
(45) Date of Patent: Jul. 8, 2003

(54) ENHANCED TIME DIVISION DUPLEXING (TDD) TRANSCEIVER CIRCUITRY

(75) Inventor: Wayne E. Pleasant, Turners Falls, MA (US)

(73) Assignee: Telaxis Communications Corporation, South Deerfield, MA (US)

( * ) Notice: Subject to any disclaimer, the term of this patent is extended or adjusted under 35 U.S.C. 154(b) by 0 days.

(21) Appl. No.: 09/557,242

(22) Filed: Apr. 24, 2000

(51) Int. Cl.[7] .................................................. H04B 1/44
(52) U.S. Cl. ........................ 455/78; 455/24; 455/67.3; 370/278; 370/280; 370/282
(58) Field of Search ........................... 455/24, 63, 67.1, 455/67.3, 78, 82, 83, 19, 226.1, 226.2, 296, 269, 280, 283, 284, 287; 370/276, 277, 278, 280, 282

(56) References Cited

U.S. PATENT DOCUMENTS

| | | | |
|---|---|---|---|
| 4,212,013 A | 7/1980 | Biethan et al. ............... 370/30 |
| 4,325,140 A | 4/1982 | Stitzer ........................ 455/19 |
| 4,411,018 A * | 10/1983 | Amoroso, Jr. ............... 455/24 |
| 5,487,179 A | 1/1996 | Larsson ....................... 455/69 |
| 5,511,233 A * | 4/1996 | Otten .......................... 455/63 |
| 5,603,098 A | 2/1997 | Kwan .......................... 455/83 |
| 5,701,595 A | 12/1997 | Green, Jr. ..................... 455/83 |
| 5,754,104 A * | 5/1998 | Saito .......................... 370/280 |
| 5,923,647 A | 7/1999 | Dolman et al. ............. 370/280 |
| 6,067,448 A * | 5/2000 | Ho et al. ...................... 455/78 |

* cited by examiner

Primary Examiner—Quochien Vuong
(74) Attorney, Agent, or Firm—Hamilton, Brook, Smith & Reynolds, P.C.

(57) ABSTRACT

A communication transceiver circuit intended for operation in a Time Division Duplex (TDD) system. The configuration eliminates the need for transmit-receive switches and the circuitry needed to operate them. Instead, a three port circulator is used to couple a transmitter section and receiver section to a common antenna. A signal power detector and blanking circuit are coupled to the receiver section input and arranged to generate a blanking signal for an input receiver amplifier. This disables the receiver during conditions when power reflected back through the antenna and circulator would otherwise saturate the receiver. In a preferred environment, a second circulator is connected to an intermediate frequency (IF) side of the transceiver together with a pair of isolators to permit the transceiver to be connected to IF equipment with a single cable.

8 Claims, 3 Drawing Sheets

ENHANCED TIME DIVISION DUPLEXING (TDD) TRANSCEIVER CIRCUITRY

BACKGROUND OF THE INVENTION

The present invention relates to a radio transceiver for providing duplex communication on a time division basis, and more particularly to a circuit for coupling a transmitter and receiver that operate in the same frequency band to a common antenna.

Certain radio communication systems provide for two-way or duplex communication by alternately transmitting and receiving in a common frequency band on a time-division basis. In this type of system, called a Time Division Duplex (TDD) system, the antenna needs to be connected at any given instant to either the transmitter or receiver, but not to both simultaneously.

One type of TDD circuit provides for connection of the transmitter and receiver to the common antenna by means of a so-called transmit-receive switch. The transmit-receive switch connects the antenna to either the transmitter or the receiver at any given time. The transmit-receive switch thus needs to be controlled by circuits that determine at any given time whether a particular time slot of a time-division multiple access (TDMA) signal is to be transmitted or received.

Several problems are presented by the introduction of a transmit-receive switch between the antenna, transmitter and receiver.

Transmit-receive switches, particularly those made of diodes or field effect transistors (FETs), can distort the modulation envelope of the transmitted signal.

A further problem introduced by the use of a transmit-receive switch is that transmit power may be reflected from the antenna back to the transmitter. This changes the effective impedance of the amplifier that is typically used as the final stage of the transmitter. This can degrade the amplifier's intermodulation characteristics, therefore requiring the need to increase its power handling capability, which reduces efficiency.

A three-port device known as a circulator may also be used to implement a TDD transceiver. Similar to a duplexer, a circulator will pass the transmit signal to the antenna with low attenuation, but will not pass the transmit signal to the receiver.

One known limitation to using a circulator in a time division duplex radio is that any transmit power reflected by the antenna (i.e., not absorbed by the antenna) may be conducted back to the receiver. The receiver, in turn, must therefore have increased power handling capability for this eventuality. One solution to this problem is available when the transmitter and receiver operate in different frequency bands. In such a case, a receiver input filter may be used to reflect the transmitter power once again back toward the transmitter. However, such signals may be passed with lower attenuation by the circulator, with the again-reflected signal in turn appearing as an impedance mismatch.

In another solution to this problem, a switching device is connected between a load and the circulator or the receiver. The receiver is connected to the circulator during known times of receiver operation and the load is connected to the circulator during times of known transmitter operation. In this manner, the load absorbs power reflected by the transmitter.

However, this solution still requires the use of a switch that is synchronized to the specific state of the TDD radio. In other words, this solution still requires the use of a switch that potentially has the associated attendant problems with introducing distortion to the modulation envelope of the transmitted signal and/or power reflections.

Further difficulties exist when TDD systems are adapted for applications such as Local Multipoint Distribution Service (LMDS). These systems make use of modems to provide intermediate frequency (IF) signals to the respective transmitter and receiver. The transmit and receive modem signals are typically coupled to the TDD radio with a single coaxial cable. As such, LMDS transceivers typically utilize switches not only on the RF side for directing signals to and from the antenna port, but also on the IF side for directing signals to and from the bi-directional ports of the modem. At any given instant in time, the state to which the IF side switch is set is determined by whether the transceiver is to operate in the transmit mode or in the receive mode.

SUMMARY OF THE INVENTION

The present invention is a circuit for a Time Division Duplex (TDD) radio that eliminates the need for transmit-receive switches and the circuitry to operate them. The circuit includes a three-port circulator on the radio frequency (RF) side to couple the transceiver to an antenna. The circulator is connected to accept a radio frequency transmit signal from a transmitter section, with the transmitter section including an intermediate frequency (IF) input stage, an up-converter, and a power amplifier. A receiver port of the circulator connects to a receiver section, which includes a receiver low noise amplifier (LNA), a receive signal power detector, a down-converter mixer, and an intermediate frequency (IF) output port. Under normal conditions, the return loss looking into the antenna through the circulator is sufficient to prevent transmit power from saturating the receiver.

However, the receive signal power detector is coupled to a blanking circuit to control the operation of the receiver low noise amplifier. In particular, the detector and blanking circuit disable the receiver during conditions when the receiver may be susceptible to saturation, such as when excessive transmit power is being reflected back from the antenna. The detector and blanking circuit may blank the receiver by disconnecting an input amplifier from its supply voltage when input signal power levels exceed a predetermined threshold.

This arrangement therefore avoids a saturation condition in the receiver which might otherwise occur. For example, while this saturation condition does not necessarily damage the receiver, it places the amplifier in a state where an unacceptably long recovery time is needed before the receiver can again operate properly. This, in turn, means that the transceiver might not switch from the transmit mode to the receive mode in a required time frame. The detector and receiver blanking circuit therefore reduce susceptibility to this problem.

Optionally, on the modem or intermediate frequency (IF) side of the transceiver, a pair of isolators are used along with a second circulator or a hybrid coupler/splitter. This permits both the IF transmit and IF receive signals to be fed to the transceiver along a single coaxial cable to a common If port.

In other embodiments, the transmit and receive signals may be carried on separate cables to the respective transmit and receive sections of the transceiver.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
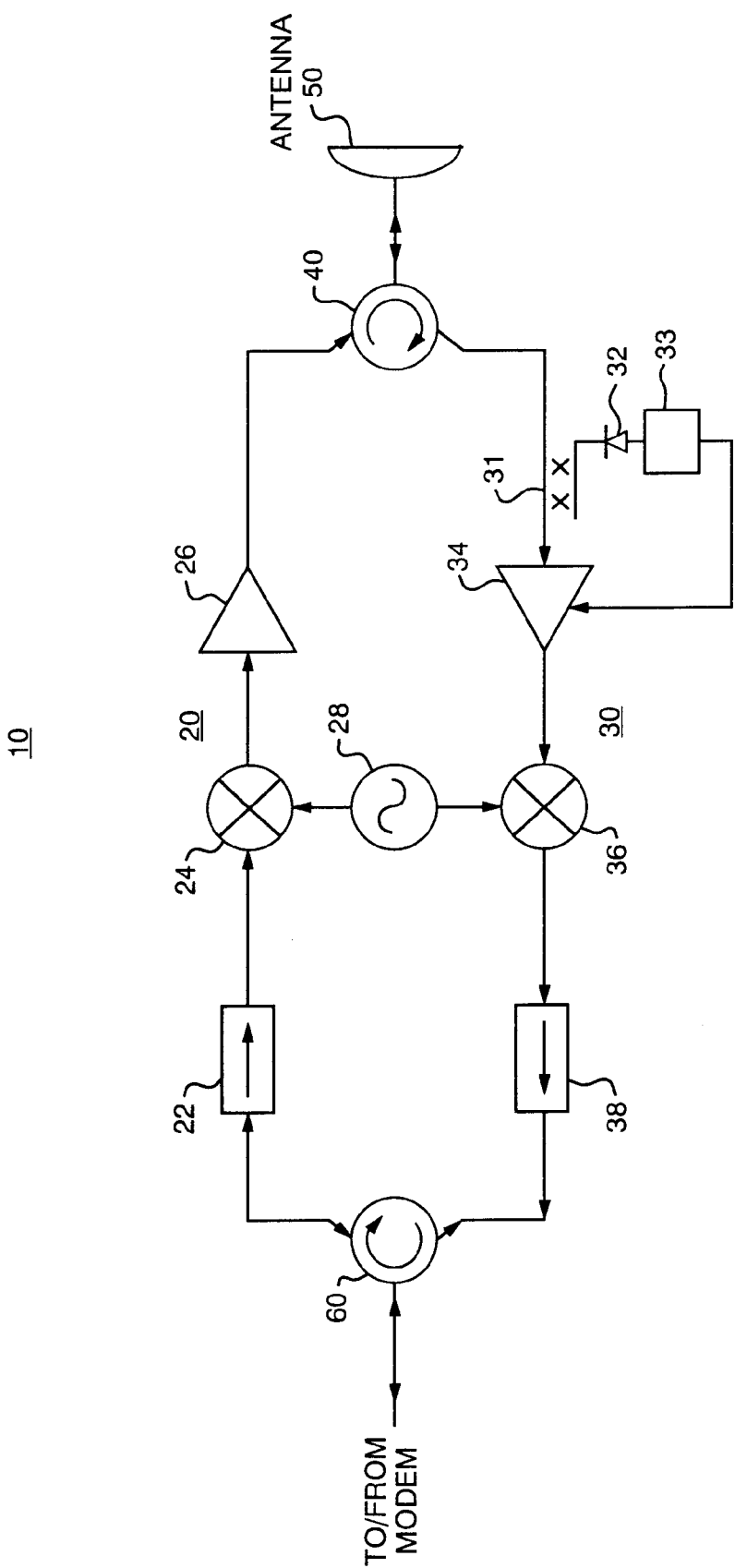
FIG. 1 is a circuit diagram of a Time Division Duplex (TDD) radio transceiver which makes use of a circulator and blanking circuit with a second circulator at the intermediate frequency (IF) port.

Turning attention now to FIG. 1, there is shown a Time Division Duplex (TDD) transceiver 10 for transmit and receive operation, using the same frequency band on a time slot basis. The transceiver 10 consists of a transmitter section 20, a receiver section 30, a radio frequency (RF) circulator 40, and an antenna 50. In the illustrated embodiment, there is also an intermediate frequency (IF) circulator 60. The illustrated transceiver circuit 10 was developed for use in a Local Multipoint Distribution Service (LMDS) type of communication system, which accepts digitally modulated intermediate frequency (IF) communication signals, such as received from a cable modem (not shown), and connects them for transmission over an antenna 50 within microwave communication radio frequency (RF) band. However, it should be understood that the illustrated circuit described herein may also be applied to other types of communication systems.

The transmitter 20 accepts an IF signal generated by the modem from the IF circulator 60, forwarding it to an isolator 22. The IF signal received from the modem is typically in a cable television frequency band, the exact frequency of which depends upon the specific application. This may, for example, be a television-type bandwidth signal in a carrier frequency range of from 50 to 750 MegaHertz (MHz). From the isolator 22, the IF signal is fed to an up-converter mixer 24 to upband the carrier frequency to a microwave frequency radio band, such as 28 GigaHertz (GHz). A power amplifier 26, which may typically consist of several amplifier stages, then provides the radio frequency (RF) signal to the RF circulator 40. An antenna port on the RF circulator 40 feeds the transmit signal to the antenna 50.

The direction of the RF circulator 40 is set such that signals output by the transmitter section 20 are directed to the antenna 50 and signals received by the antenna 50 are directed to the receiver section 30.

In the receive direction, RF signals received at the antenna 50 are fed through the RF circulator 40 to the receiver section 30. Under normal conditions, the return loss looking into the antenna 50 through the circulator 40 is sufficient to prevent the transmitter output power from saturating the receiver section 30.

The receiver section 30 includes one or more low noise amplifiers 34 and a down-converter mixer 36. These operate to convert the RF signal output offered by the RF circulator 40 to an IF signal compatible with the cable modem input.

However, the receiver section 30 also includes a signal detection circuitry consisting of a coupler 31 and detector 32, and a blanking circuit 33, in addition to the low noise amplifiers (LNAS) 34, and a down-converter mixer 36.

In operation, signals received from the RF circulator 40 are fed to the coupler 31, which provides a portion of the received signal energy to the detector 32. The detector 32 in turn feeds the blanking circuit 33 to control a supply voltage $V_{ss}$ on at least one of the low noise amplifiers 34. This may, for example, be an initial stage of the low noise amplifiers 34.

The threshold detector 32 and blanking circuit 33 are therefore arranged to control blanking of the receiver section 30. In particular, when an input power level to the receiver portion 30 exceeds a predetermined threshold, as determined by the directional coupler 31 and detector 32, the blanking circuit 33 is energized. The blanking circuit in turn changes the gate bias of a Field Effect Transistor (FET) to place the amplifier 34 into pinch off. In an alternate embodiment, the blanking circuit may disable the amplifier supply voltage $V_{ss}$.

As such, this arrangement protects the receiver section 32 from entering saturation when an excessively high level of transmit power is reflected back from the antenna 50 through the circulator 40. Such a condition may occur if blockage is introduced in front of the antenna 50. This in turn causes reflected RF energy received by the antenna 50 to pass through the RF circulator 40 and into the receiver section 30. In the absence of the coupler 31, detector 32 and blanking circuit 33, if the level of reflected power was sufficiently high to saturate the low noise amplifier 34, this would result in additional recovery time being needed for the amplifier before it could operate again properly. To prevent this condition, the blanking circuit 33 is energized when the input power level to the low noise amplifier 34 is excessive.

In addition, the IF side of the transceiver 10 may optionally includes a pair of isolators 22 and 38. These isolators 22 and 38 are, respectively, connected to the IF input to the transmitter mixer 24 and the IF output of the receiver mixer 36. The IF circulator 60 in turn permits the IF transmit and receive signals to be carried on a single coaxial cable or other physical medium between the transceiver 10 and cable modem.

Figure 2:
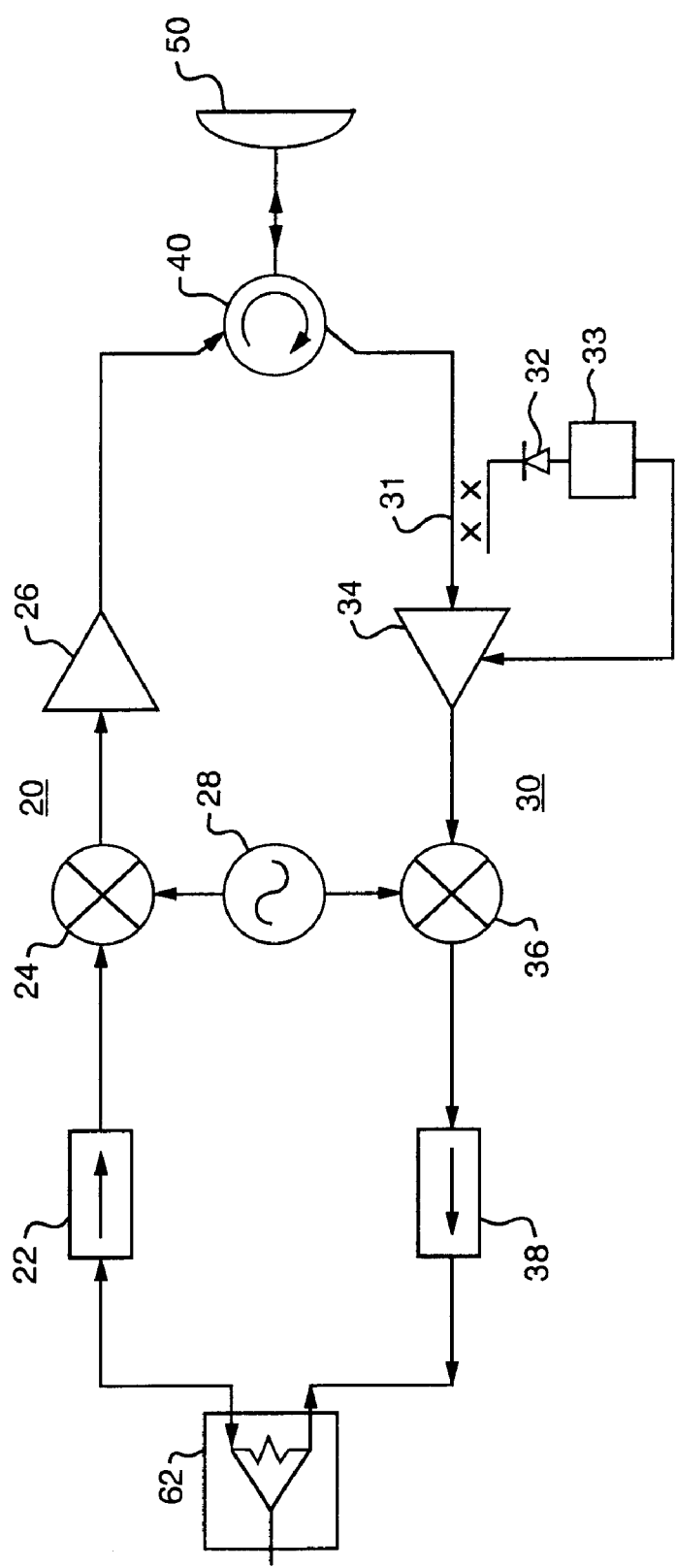
FIG. 2 is a circuit diagram of a TDD transceiver making use of a directional coupler at the IF port.

A power splitter 62 may be used in place of the IF circulator 60, as shown in FIG. 2. The power splitter 62 can be a directional coupler or hybrid coupler. However, use of a splitter 62 typically introduces an approximately one-half or 3 decibel (dB) power loss to the output of the transmitter section 40. In addition, the use of a splitter 62 typically dictates that the isolators 22 and 38 must be used. Therefore, the circulator 60 arrangement of FIG. 1 is the preferred implementation. It should be understood that circulators 60 typically tend to be more expensive than power splitters 62, however.

Figure 3:
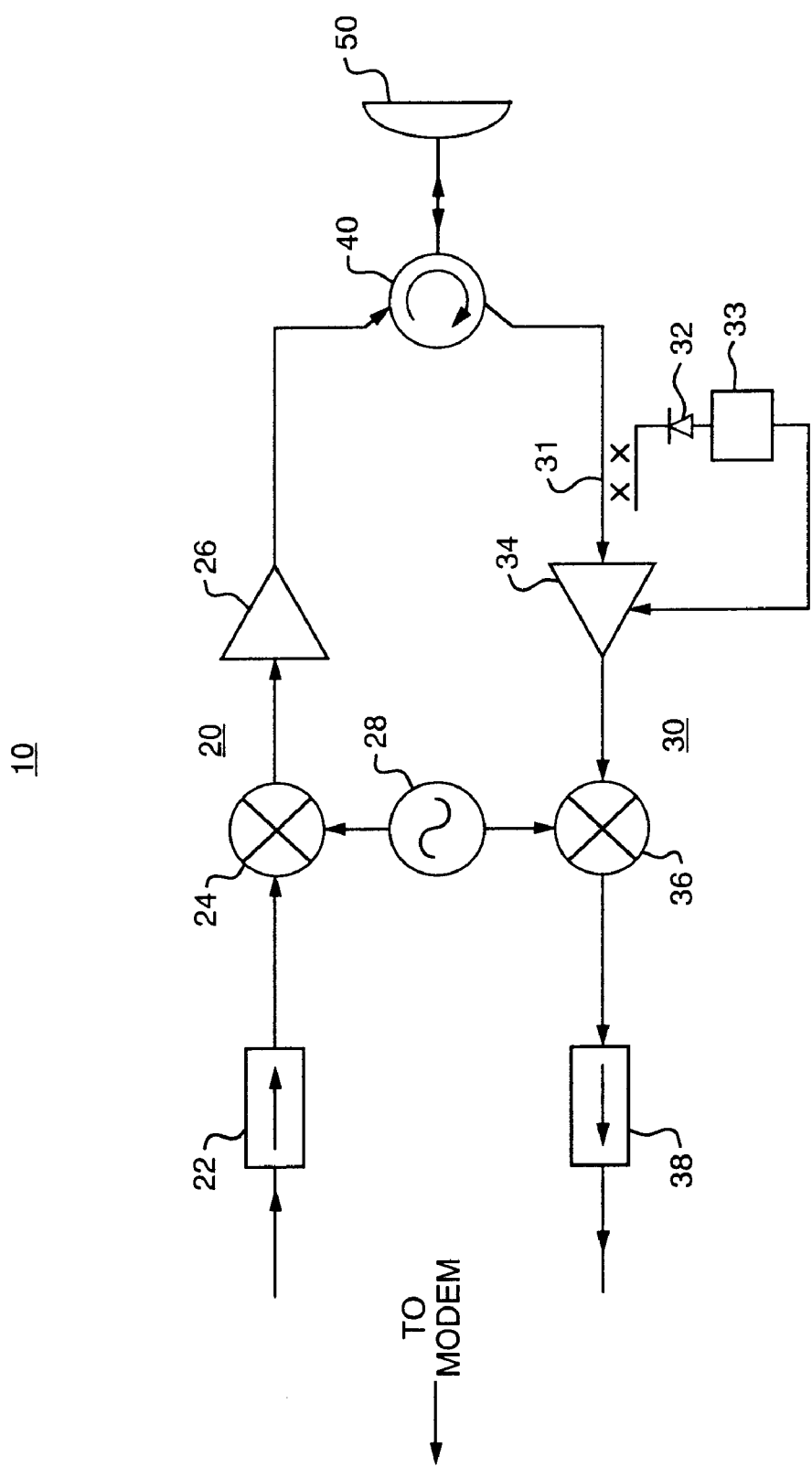
FIG. 3 is a circuit diagram of a TDD transceiver in which separate transmit and receive IF ports are provided.

Alternatively, as shown in FIG. 3, the isolators 22 and 38 can be kept physically separate, with separate IF transmit and receive ports provided for the modem. In this case, neither a circulator 60 nor a power divider 62 is needed; indeed even the isolators 22 and 38 would be eliminated. However, an additional cable needs to be run between the transceiver and the modem with this arrangement. This may be a consideration in installations where the transceiver 10 may be located outdoors or up on a pole or tower and the modem located indoors or otherwise at some distance away from the modem.

While this invention has been particularly shown and described with references to preferred embodiments thereof, it will be understood by those skilled in the art that various changes in form and details may be made therein without departing from the scope of the invention encompassed by the appended claims.

What is claimed is:

1. A transceiver apparatus for transmitting and receiving radio signals in a time division duplex (TDD) system, the apparatus comprising:

a transmitter section comprising at least a transmitter amplifier coupled to accept an intermediate frequency (IF) transmitter input signal and provide a radio frequency (RF) transmitter output signal;

a receiver section comprising at least a receiver amplifier coupled to receive an RF receiver input signal and to provide an IF receiver output signal;

an RF circulator, having a first port connected to receive the transmitter output signal, a second port connected to provide the RF receiver input signal, and a third port for coupling to an antenna;

a detector, connected to the receiver section to detect when a power level associated with the RF receiver input signal exceeds a predetermined power level; and a blanking circuit for disabling the receiver amplifier when the detector determines that the RF receiver input signal exceeds a predetermined power level.

2. An apparatus as in claim 1 wherein the detector additionally comprises a directional coupler.

3. An apparatus as in claim 1 wherein the blanking circuit controls a supply voltage of the receiver amplifier.

4. An apparatus as in claim 1 additionally comprising:

a transmitter isolator disposed before the transmitter section, to provide the IF transmitter input signal.

5. An apparatus as in claim 1 additionally comprising:

a receiver isolator disposed after the receiver section, coupled to receive the IF receiver output signal.

6. An apparatus as in claim 1 additionally comprising:

an IF circulator, having a first port connected to receive the IF receiver output signal, a second port connected to provide the IF transmitter input signal, and a third port providing a transceiver input-output port.

7. An apparatus as in claim 1 additionally comprising:

a splitter having a first port connected to receive the IF receiver output signal, a second port connected to provide the IF transmitter input signal, and a third port providing a transceiver input-output port.

8. A apparatus as in claim 1 wherein the transmitter and receiver sections operate at a radio frequency carrier in a Local Multipoint Distribution Service (LMDS) band.

* * * * *